Aug. 23, 1932.  H. L. DOHERTY  1,872,908
DISTILLING HYDROCARBON OILS
Filed Jan. 20, 1923
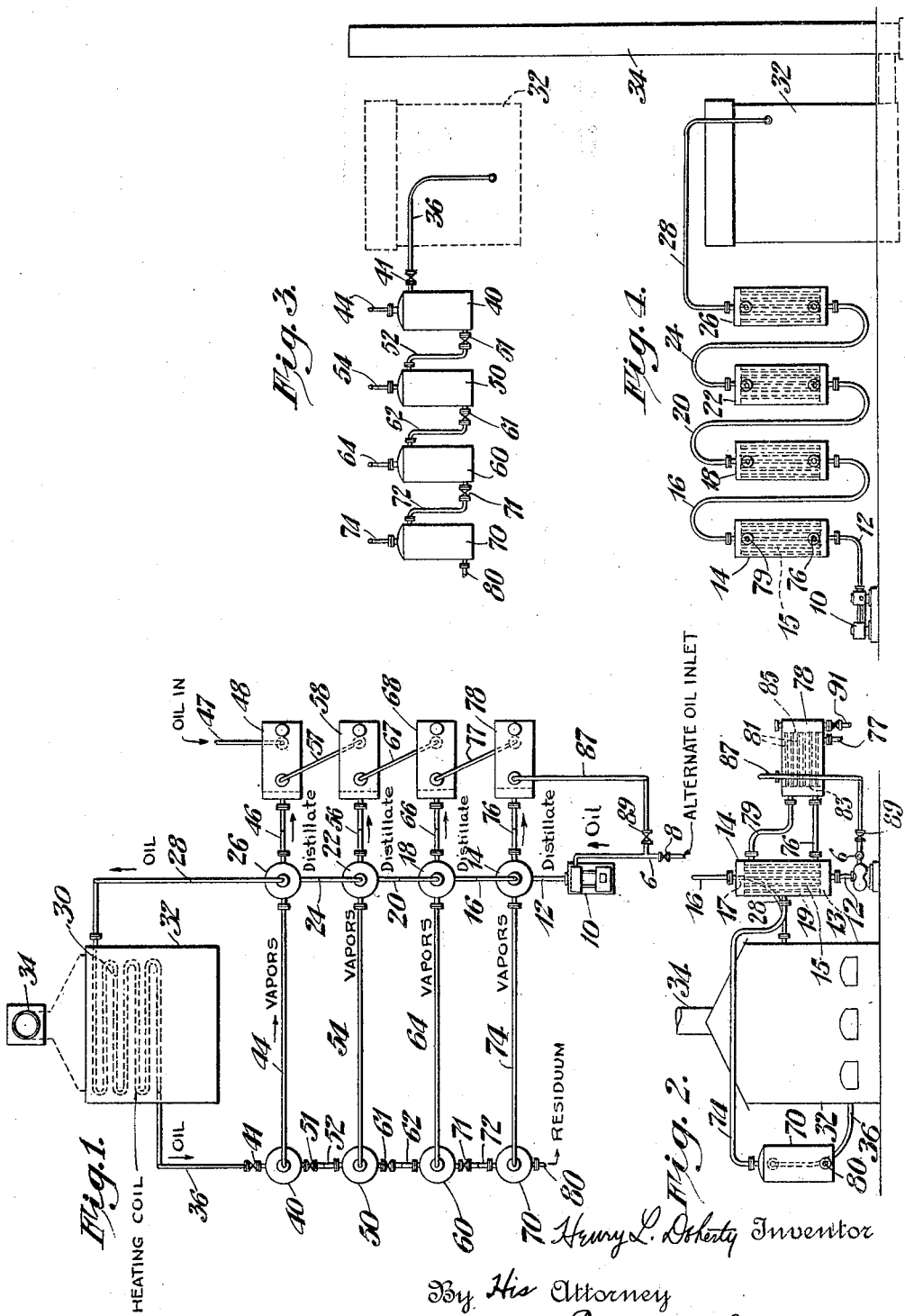
Henry L. Doherty Inventor
By His Attorney
Edmund G. Borden Patented Aug. 23, 1932

1,872,908

UNITED STATES PATENT OFFICE

HENRY L. DOHERTY, OF NEW YORK, N. Y., ASSIGNOR TO DOHERTY RESEARCH COMPANY, OF NEW YORK, N. Y., A CORPORATION OF DELAWARE

DISTILLING HYDROCARBON OILS

Application filed January 20, 1923. Serial No. 613,800.

This invention relates to the art of distilling hydrocarbon oils, and more particularly to a process and apparatus for topping, fractionating or distilling hydrocarbon oils whereby the oil after being heated under pressure is expanded in stages to gradually reduce the pressure thereon and to remove vapor fractions therefrom.

The method of fractional distillation as ordinarily carried out takes place under substantially constant pressure, that is, atmospheric pressure, and the vapors produced in the distillation are condensed under atmospheric pressure. Oil is commonly distilled under pressure, but this pressure distillation is not a fractional distillation, but rather a destructive distillation or what is commonly known as cracking. In the cracking process the oil is heated to a cracking temperature which temperature is higher than the normal boiling temperature of the oil, the cracking temperature being attained by holding the oil under a comparatively high pressure. In cracking oil it is not the intention to separate a series of fractions, but, on the contrary, the aim is to produce as much as possible of one desired constituent, such as gasoline, from the oil being distilled.

According to the method of distillation of the present invention, oil or other hydrocarbon material to be distilled is preheated by vapors produced in the process, and is then heated under pressure to a point at which vapors will be distilled from the oil when the pressure there is substantially reduced. The reduction in pressure takes place in a series of stages by passage of the oil through valves into expansion chambers. The vapor fraction released in each expansion chamber is withdrawn therefrom and is passed to one of the preheaters where it is cooled and condensed under the existing pressure. Vapors from the first expansion chamber are passed through the preheater last in the series and the vapors from the second expansion chamber are passed through the preheater next to the last in the series, etc. By this process a remarkably complete separation of the various oil fractions is obtained with a minimum of heat loss.

The objects of the present invention are as follows:

To provide a process and apparatus for fractionating oil whereby a clean and efficient separation of oil fractions from the oil may be obtained.

To attain a process of oil distillation whereby the heat of vaporization of the various oil fractions may be employed to preheat oil to be distilled.

To produce an oil fractionating process whereby certain vapor fractions may be removed from oil at certain predetermined temperature cuts by controlling or regulating stage reductions in pressures.

To provide a process and apparatus for topping oil whereby light ends of the oil may be removed in fractions of varying gravities which may be utilized for blending gasoline.

With these and other objects in view the invention consists in the improved process and apparatus for distilling oils hereinafter described, and particularly defined in the claims.

The invention will be best understood by describing it in connection with the accompanying drawing, in which:

Fig. 1 is a plan view of the arrangement of apparatus whereby the invention is carried out.

Fig. 2 is an elevational view of the apparatus shown in Fig. 1;

Fig. 3 is a side elevation of the expansion chambers shown at the left in Fig. 1, and Fig. 4 is a side elevation showing the series of preheaters through which oil is passed to the heating coil.

According to the present invention oil is received through a pipe 6 having a valve 8 therein and pumped under pressure by means of a pump 10 through a pipe 12, thence through a series of preheaters 14, 18, 22 and 26 in which the oil is preheated.

The oil passes through tubes in the preheaters which are preferably arranged in a manner similar to those of a surface condenser, being expanded into tube sheets as is indicated in Fig. 2 of the drawing. Oil passing upwardly through the pipe 12 first reaches the lower chamber 13 of the preheater 14 from which the oil is distributed through tubes 15 and passes upwardly into an upper chamber 17 of the preheater. From the chamber 17 the oil flows through a crossover pipe 16 leading to the lower chamber of the next preheater 18. Surrounding the tubes 15 and between the chambers 13 and 17 is a chamber 19 in which vapors from a subsequent part of the process are condensed by contact with the surfaces of the tubes 15 which are cooled by the oil being preheated. The various preheaters in the series are preferably constructed alike, but their capacities may be varied in the series as may be found to be advantageous in the removal of various oil fractions from different types of crude or distilled oils. Preheaters 18 and 22 are connected by a pipe 20 and preheaters 22 and 26 are connected by a pipe 24. Oil from the pipe 12 passes through the series of preheaters and through the pipes connecting them, and from thence through a pipe 28 to a heating coil 30. The coil 30 is mounted in a furnace 32 which is heated in any desired manner, as, for example, by the use of coal or oil burners. Combustion gases from the fuel in the furnace pass around the coil and heat the oil therein to the desired temperature, after which they are allowed to pass into the atmosphere through a stack 34 diagrammatically represented in Figs. 1 and 2.

In the heating coil 30 the oil is heated to such a temperature under the given pressure that when a subsequent reduction in pressure is allowed to take place, various fractions will be removed therefrom. The temperatures and pressures at which the process of distillation should be carried on will vary somewhat, depending upon the character of the oil treated, but generally a pressure of approximately ten atmospheres and a temperature of from 400° to 600° F. will be found to be satisfactory. It is desirable that cracking of the oil shall not take place to any appreciable extent and for this reason the temperature of the oil should be maintained below the initial cracking temperature for the particular oil treated which will vary from 600° to 700° F. or thereabouts.

The oil after passing through the coil 30 is in the condition for fractional distillation and is withdrawn from the heating coil through a pipe 36 which leads to an expansion chamber 40. In the pipe 36 is an expansion or pressure reducing valve 41 through which the oil passes on its way to the expansion chamber 40 and by which the pressure on the oil is reduced by about 2½ atmospheres, through which a pressure of approximately 7½ atmospheres is attained in the chamber 40. Through the reduction in pressure a certain proportion of the lighter fractions of oil will be vaporized in the expansion chamber 40, the residual oil passing to the bottom thereof to be withdrawn through a pipe 52 while the vapors pass off at the top of the expansion chamber and flow through a pipe 44 to the preheater 26. The vapors which are conducted to the preheater 26 pass into the chamber around the tubes in which the incoming oil is being preheated. The pressure in the tube chamber of the preheater 26 is maintained substantially the same as the pressure of the corresponding expansion chamber 40 and under this pressure the vapors in the preheater 26 become liquefied by the cooling action of the oil to be preheated. After the vapors are liquefied they pass through a pipe 46 to a heat exchanger 48 which may be cooled by means of water or oil.

The residual oil from which the first vapor fraction has been removed is again subjected to a pressure reduction of substantially 2½ atmospheres in passing through an expansion valve 51 and flows through a pipe 52 to an expansion chamber 50 similar to chamber 40. The pressure in the expansion chamber 50 is therefore substantially five atmospheres. A second vapor fraction is released from the oil in the expansion chamber 50 and passes through a pipe 54 to a chamber in the preheater 22 which is cooled by the oil passing through the tubes therein. The vapors which condense in the preheater 22 pass through a pipe 56 to a heat exchanger 58 in which the condensed liquids are further cooled. After the removal of the vapor fraction from the oil in the expansion chamber 50 the residual oil passes through an expansion valve 61 by which the pressure is again reduced about 2½ atmospheres and the pressure reduced oil then flows through a pipe 62 into an expansion chamber 60. Vapors which are released in the expansion chamber 60 pass through a pipe 64 to a chamber in the preheater 18, in which the vapors are condensed under a pressure substantially the same as that existing in expansion chamber 60. The vapors which are condensed in the preheater 18 pass in the form of a liquid through a pipe 66 to a heat interchanger 68 which is cooled in the same manner as the preceding exchangers to reduce the vapor pressure of the liquids. From the expansion chamber 60 the residual oil passes through an expansion or reducing valve 71 where the pressure is reduced to substantially atmospheric pressure and then flows through a pipe 72 into an expansion chamber 70. The vapors released in this chamber pass through a pipe 74 to a chamber in the preheater 14 in which the vapors passing thereto are cooled. The condensed vapors pass from the chamber of the preheater 14 through a pipe 76 to heat exchanger 78, in which the condensed vapors are maintained under substantially atmospheric pressure.

The residual or undistilled oil passes from the last expansion chamber 70 through a pipe 80 to a still, where it may be further distilled, or to storage where it may be utilized for any desired purpose.

The heat interchangers 48, 58, 68 and 78 to which the various oil fractions are passed in order to be cooled are preferably constructed in a manner very similar to that of the preheaters 14—26 having a series of tubes 81 expanded into tube sheets 83 and 85, so that there are chambers at each end of the interchanger directly connected by tubes as shown in Fig. 2 of the drawing. The chamber at one end of the heat interchangers is connected to a pipe such as 76, which joins the compartment in which vapors are condensed at the lower end of a preheater above the tube sheet with the lower end of a heat interchanger, and a second pipe 79 serving as an equalizing pipe, joins the upper portion of the chamber at the end of the heat interchanger, with the same compartment at the upper part of the preheater so as to permit flow of liquid to the heat interchangers.

The liquid distillates which are cooled in the interchangers may be withdrawn from a pipe such as 91 at the bottom of each interchanger, or may be passed to condensers to be further cooled if desired. When water is employed as the cooling medium in the heat interchangers it is preferable to pass cold water into each interchanger through a pipe at the bottom thereof corresponding to pipe 77 and withdrawing the water through the pipe 87 at the top thereof. If desired, the oil to be treated may be circulated through the series of heat interchangers 48, 58, 68, 78, to be used as a cooling medium rather than water. By the use of oil to cool the liquid distillates in place of water the heat of the liquid distillates which would otherwise be lost is conserved in the process. When oil is used as a cooling medium it is passed from storage under a super-atmospheric pressure through a pipe 47 into the central chamber of the heat interchanger 48 surrounding the tubes therein and passes upwardly around the pipes serving as a cooling medium for the liquid distillate therein. The oil after passing through the first of the heat interchangers 48 is withdrawn through a pipe 57 which connects the top of the interchanger 48 with the bottom of the interchanger 58, and passes through the pipe to the central chamber of the heat interchanger 58 surrounding distillate cooling pipes therein. Likewise the oil from the heat interchanger 58 flows by the pipe 67 to the interchanger 68. From the interchanger 68 the oil flows through a pipe 77 into the last interchanger 78 of the series of heat interchangers. From the interchanger 78 the oil flows through a pipe 87 which connects the interchanger with the inlet pipe 6. The pipe 87 has a valve 89 therein which is closed when oil is fed directly from storage to the pipe 6, but is opened when oil to be treated is first passed through the series of heat interchangers, in which case the valve 8 in the pipe 6 is closed. The oil after passing through the series of heat interchangers is pumped by means of the pump 10 through the pipe 12 and through the series of preheaters as has been previously described, and the various distillates issuing through the pipes 46, 56, 66 and 76 then pass to the corresponding heat interchangers 48, 58, 68 and 78, so that the vapors released at the higher pressure, and therefore at the higher temperature, are cooled to the greater degree by passing through a colder heat interchanger of the series. Thus the distillate issuing from the expansion chamber 40 which is at the highest temperature and pressure of the series, and is the most volatile of the fractions, is cooled to the greatest degree by passing into heat interchanger 48, through which oil to be treated is first introduced. The vapors which are released in the second expansion chamber 50 are at a lower temperature and pressure than the vapors released in expansion chamber 40 and are condensed in the distillate chamber of the preheater 22 and pass to the next coldest heat interchanger 58 in the series, etc. In this manner the vapors which are first released and which have the lowest boiling point, and should therefore be maintained at the lowest temperature to prevent their vaporization, are thus passed to the heat exchanger having the lowest temperature in the series of exchangers and thus conserving the maximum amount of heat in the process. If desired, the various oil fractions may be further cooled by passing through water condensers of the usual form (not shown in the drawing).

During the fractionation or distillation of the oil undergoing treatment the valves 41, 51, 61 and 71 may be regulated so that a decrease in pressure on the oil of approximately 2½ atmospheres takes place as the oil passes through each valve. It may be desirable in treating oils differing in composition from those ordinarily treated to vary the setting of the valves so as to attain a drop in pressure greater or less than 2½ atmospheres. If, for instance, an oil contains considerably less gasoline than that normally treated, and it is desired to obtain the gasoline fraction separately, then the valve leading to the expansion chamber where the gasoline vapors are to be removed is regulated so that the pressure drop is such that substantially only the gasoline fraction will be removed in that chamber. Similarly, others of the pressure reducing valves may be regulated so that only certain desired fractions of the oil may be liberated in the corresponding expansion chambers.

The above process may be employed for the topping of oil or for ordinary distillation. When the process is used for topping of oil it is desirable that the oil residue from the process employed should be treated at once by passage to a suitable still in order to conserve the heat of the liquid, which in this case is very considerable. If ordinary distillation is carried on, however, the oil residue may be passed directly to burners or to storage to be employed in any manner desired. If desired the heat of the residue may be conserved by passing the incoming oil into heat transferring relation with the residue.

It is contemplated that various modifications of the above process may be made without departing from the spirit or scope of the invention as set forth in the claims. If desired, means other than valves might be employed for reducing the pressure on the oil passing to the expansion chambers or the expansion chambers might be employed alone for this purpose. It is desirable to employ the countercurrent principle in heat transference wherever it is possible in the process, but it is to be understood that the process is not limited to this mode of heat transfer, and the process may be varied to suit operating conditions, as may be found advantageous.

Having thus described the invention, what is claimed as new is:

1. In the art of fractionating oil, a method which comprises passing oil under pressure through a series of heat interchanging stages maintained at increasing temperatures through the series, thereafter passing the oil through a second series of heat interchanging stages maintained in heat interchanging relationship with vapors under increasing pressures through the series, thereafter heating the oil to a distilling temperature, releasing the pressure on the oil in a series of stages, passing the vapors released in each stage through the second mentioned series of heat interchanging stages under substantially the pressure at which the vapors are released in each stage to condense said vapors, and thereafter passing the condensed vapors through the first named series of heat interchanging stages.

2. In the art of fractionating oil, a process which comprises passing oil under pressure through a series of hot zones maintained at increasing temperatures through the series by heat interchanging relationship with condensed vapors from subsequent steps in the process, thereafter passing the oil through a second series of hot zones maintained at increasing temperatures through the series by heat interchanging relationship with vapors under increasing pressure through the series, thereafter heating the oil to a distilling temperature, reducing the pressure on the heated oil in a series of expansion zones, passing the vapors released in each zone under the pressure thereof into heat interchanging relation with the said oil passing through the said second series of zones to condense said vapors, and thereafter passing the condensed vapors into heat interchanging relationship with the said oil passing through the first mentioned series of zones.

3. In the art of fractionating oil, the method which comprises passing oil through a series of heat interchanging zones maintained at increasing temperatures by distillates from subsequent steps in the process and thereafter passing the oil through another series of preheating zones maintained at increasing temperatures through the series, heating the oil thereafter to substantially a distilling temperature under superatmospheric pressure, reducing the pressure on the said oil in a series of zones to obtain separate vapor fractions therefrom, passing the individual vapor fractions through individual zones of the second mentioned series of heat interchanging zones at substantially the same pressure under which the vapor fractions were obtained to condense said fractions and thereby produce said distillates.

4. The process of distilling oils, which comprises passing oil to be distilled under superatmospheric pressure through a series of heat interchanging zones maintained at increasing temperature through the series by passing vapors evolved in the process through said zones, passing the oil from the last of the said zones through a final heating zone where said oil is heated under a pressure of substantially 10 atmospheres and to a temperature of substantially 500° F., passing the thus heated oil through a series of vaporizing zones in which the pressure maintained on the oil is successively lower as the oil advances through the series, whereby a corresponding series of vapor fractions are formed, maintaining a substantially atmospheric pressure on the oil in the last vaporizing zone, and condensing the vapors from said zones.

In testimony whereof I affix my signature.

HENRY L. DOHERTY.